US 6,668,997 B2

(12) United States Patent
Sander et al.

(10) Patent No.: US 6,668,997 B2
(45) Date of Patent: Dec. 30, 2003

(54) DEVICE FOR FIXING A HYDRAULIC CLUTCH ACTIVATING DEVICE, ESPECIALLY A CLUTCH SLAVE CYLINDER

(75) Inventors: Edmund Sander, Leonberg (DE); Thomas Seiler, Weissach (DE)

(73) Assignee: Ing. h.c.F. Porsche AG, Weissach (DE)

( * ) Notice: Subject to any disclaimer, the term of this patent is extended or adjusted under 35 U.S.C. 154(b) by 1 day.

(21) Appl. No.: 10/089,686

(22) PCT Filed: Jul. 5, 2001

(86) PCT No.: PCT/EP01/07694

§ 371 (c)(1),
(2), (4) Date: Apr. 3, 2002

(87) PCT Pub. No.: WO02/12745

PCT Pub. Date: Feb. 14, 2002

(65) Prior Publication Data

US 2002/0175034 A1 Nov. 28, 2002

(30) Foreign Application Priority Data

Aug. 4, 2000  (DE) ........................................ 100 38/ 012

(51) Int. Cl.[7] ............................................... F16D 25/08
(52) U.S. Cl. ..................... 192/85 C; 192/115; 92/161
(58) Field of Search .............. 192/85 C, 115; 92/128, 161; 60/533

(56) References Cited

U.S. PATENT DOCUMENTS

| 3,182,443 | A |   | 5/1965  | Hermanns |
|-----------|---|---|---------|----------|
| 4,516,748 | A |   | 5/1985  | Nix et al. |
| 4,640,478 | A | * | 2/1987  | Leigh-Monstevens ...... 248/27.1 |
| 6,000,516 | A | * | 12/1999 | Teichert et al. ........... 192/85 R |
| 6,453,796 | B1| * | 9/2002  | Rocquet ....................... 92/161 |

FOREIGN PATENT DOCUMENTS

| DE | 1750532    | 1/1971 |
| FR | 2785357    | 5/2000 |
| GB | 2345099 A  | 6/2000 |
| JP | 63125829   | 5/1988 |

OTHER PUBLICATIONS

International Search Report PCT/EP01/07694.

* cited by examiner

*Primary Examiner*—Richard M. Lorence
(74) *Attorney, Agent, or Firm*—Crowell & Moring LLP

(57) ABSTRACT

An arrangement includes a clutch operating device that has an elongated cylinder casing with a first end and a second end, and a transmission casing that has an opening. The first end of the cylinder casing extends into the opening of the transmission casing and is radially supported by interior wall of the opening of the transmission casing, and the second end of the cylinder casing is axially supported on the transmission case.

31 Claims, 3 Drawing Sheets

DEVICE FOR FIXING A HYDRAULIC CLUTCH ACTIVATING DEVICE, ESPECIALLY A CLUTCH SLAVE CYLINDER

BACKGROUND AND SUMMARY OF THE INVENTION

The invention relates to an arrangement for fastening a hydraulic clutch operating device, particularly a clutch operating cylinder.

For fastening such clutch operating devices, it is generally known to provide a fastening flange laterally at the end of the cylinder. The fastening flange is used to fasten the clutch operating cylinder, by means of fastening screws, on a casing of the internal-combustion engine or of the transmission. The installation or removal of this highly stressed component is often difficult because an easy access to the fastening screws is often difficult to achieve.

German Patent Document DE-AS 17 50 532 discloses a hydrostatic clutch operating device in which the operating cylinder is suspended between the clutch release lever and a ball pin screwed into the engine block. The clutch operating cylinder is not guided or secured in the radial direction.

It is therefore an object of the invention to improve the fastening of a clutch operating cylinder such that it can be mounted or demounted in a simple manner in the transmission case of an internal-combustion engine, while, when installed, it is simultaneously fastened such that it can securely transmit the operating forces absorbed by it to the clutch release mechanism.

How this object is achieved is described as follows. The arrangement according to the invention and the clutch operating cylinder according to the invention each include a simple construction which permits a one-handed mounting of the clutch operating cylinder into the transmission case. Only one fastening screw is used to fasten the clutch operating cylinder on the casing which protects it from being lost. In this case, among other things, because of a pressure spring arranged in the clutch operating cylinder, a self-holding mounting position is achieved. While it is conventional to use, for example, two fastening screws to fasten the open end of the cylinder, through which the push rod is guided on the casing of the internal-combustion engine, only a radial guiding is provided within an opening in the transmission case in the present invention. Because the other end of the operating cylinder is axially supported on the transmission case, the fastening screw provided at this end is free of operating forces and is therefore used only for securing the operating cylinder on the transmission case of the internal-combustion engine.

Additional advantageous developments and improvements of the arrangement according to the invention and of the clutch operating cylinder according to the invention are described as follows.

An elastic sleeve, which closes off the open end of the operating cylinder and surrounds the push rod, is fastened on a flange part of the operating cylinder so that, when installed, the section of the sleeve placed over the flange rests on its exterior side against the interior wall of the transmission case opening. This advantageously achieves a play-free radial accommodation of the clutch operating cylinder in the transmission case.

Because the ring section of the sleeve is toroidally curved toward the outside, the clutch operating cylinder can be introduced by means of its sleeve slide in a simple manner diagonally into the opening of the transmission case in order to be changed or swivelled by means of its rearward end into the fastening position. It is only in this position that the maximal contact surface is achieved between the interior wall of the transmission case opening and the toroidal ring section of the sleeve, which contact surface ensures a secure radial guidance of the clutch operating cylinder.

The radial recesses provided on the interior side of the ring section of the sleeve advantageously increase the radial elasticity of the sleeve arranged between the interior wall of the transmission case opening and the clutch operating casing.

Because of a ring-type sealing lip provided on the sleeve, dirty water, or similar substances, cannot enter the clutch space by way of the transmission case opening. In addition, as a result of the spring effect of the ring-type sealing lip supported axially on an exterior surface of the transmission case opening, a self-holding end position of the clutch operating cylinder is achieved.

Because of a stop provided at the cylinder end, the clutch operating cylinder can in a simple manner be clamped into a projection of the transmission case.

An embodiment of the invention is illustrated in detail in the following description and drawing.

DETAILED DESCRIPTION OF THE DRAWINGS

Figure 1:
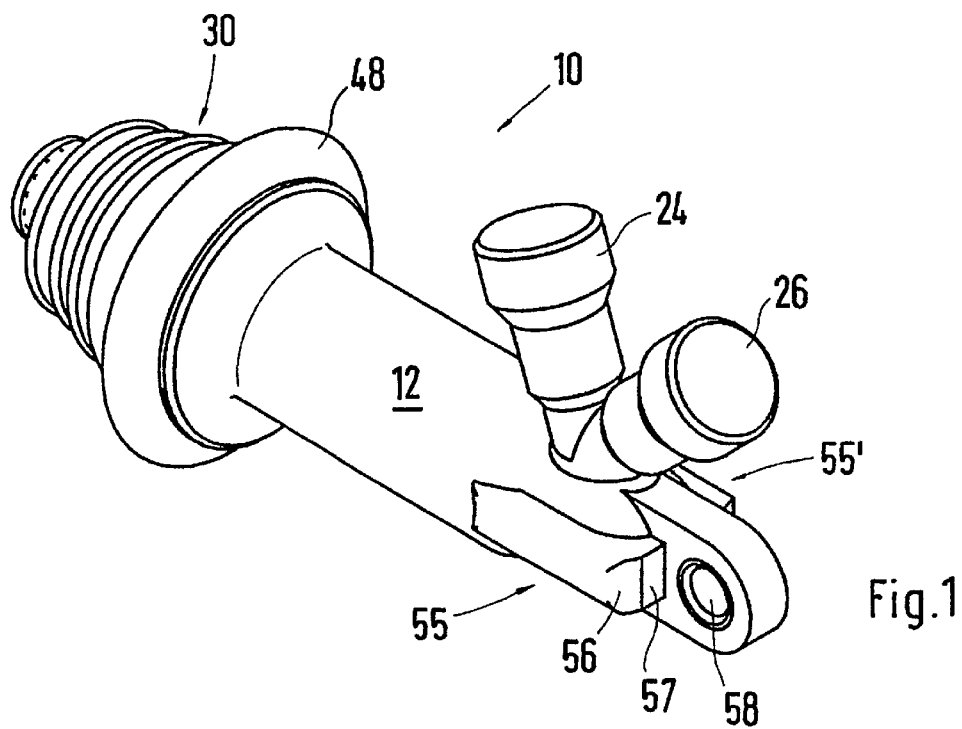
FIG. 1 is a perspective view of a clutch operating cylinder.

The clutch operating cylinder 10 has a cylinder casing 12 in which a piston 16 is arranged in a known manner. The piston 16 has a push rod 14. On the side facing away from the push rod 14, the piston 16 closes off a pressure space 18 in which a pressure spring 20 is arranged which, on one side, is supported on the piston bottom and, on the other side, is supported on the closed end 22 of the cylinder casing 12.

At the closed end 22 of the cylinder casing 12, two connection pieces 24 and 26 are provided which are connected with the pressure space 18. The connection piece 24 is hydraulically connected with a master cylinder which is not shown, while a ventilating valve for the pressure space 18 is integrated in the connection piece 26. The sealing-off of the pressure space 18 with respect to the side of the piston 16 connected with the push rod 14 takes place in a known manner, for example, by a lip seal sleeve (not shown) extending radially around the piston. The axial movement of the piston or of the push rod 14 for operating the clutch release lever is limited also in a known manner, for example, by a securing ring fastened at the open end 28 of the cylinder casing 12.

Figure 4:
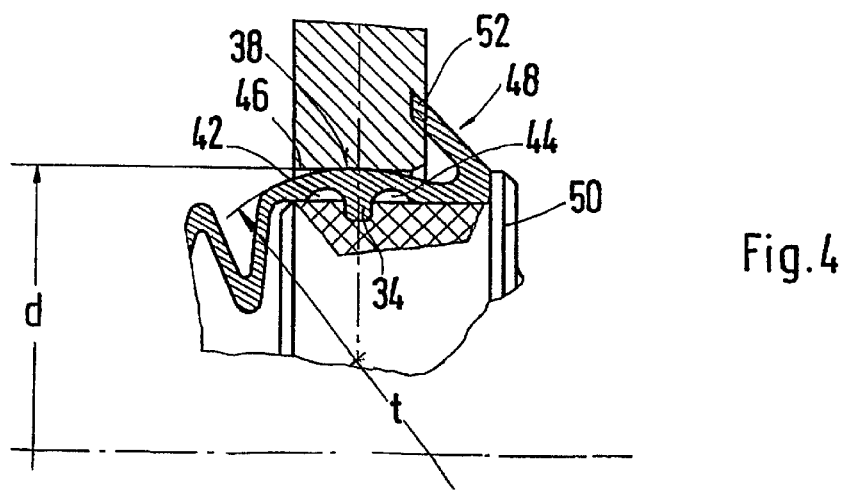
FIG. 4 is an enlarged view of the cutout X in FIG. 3.

The push rod 14 is enclosed by an elastic sleeve, which is hereinafter called bellows 30. The end of the bellows 30 having a larger diameter is placed onto a flange part 32 of the cylinder casing 12, and a radial internal web 34 molded to the bellows 30 engages as an antislide device in a ring groove on the flange surface 32. The other end of the bellows 30 having a smaller diameter is surrounded by a sheet metal cap 36 at the end of the push rod 14 having a spherical construction. The ring section 38 placed on the flange surface 32 is constructed to be curved toward the outside. As illustrated in an enlarged manner in FIG. 4, the ring section 38 has a toroidally curved section which, in the present embodiment, is constructed with a diameter of t=30 mm, while the diameter of the rotationally symmetrical ring section 38 has a diameter of d=45 mm. As will be described in detail below, this toroidally curved section is important for the installation of the clutch operating cylinder 10 in a transmission case 40.

Figure 3:
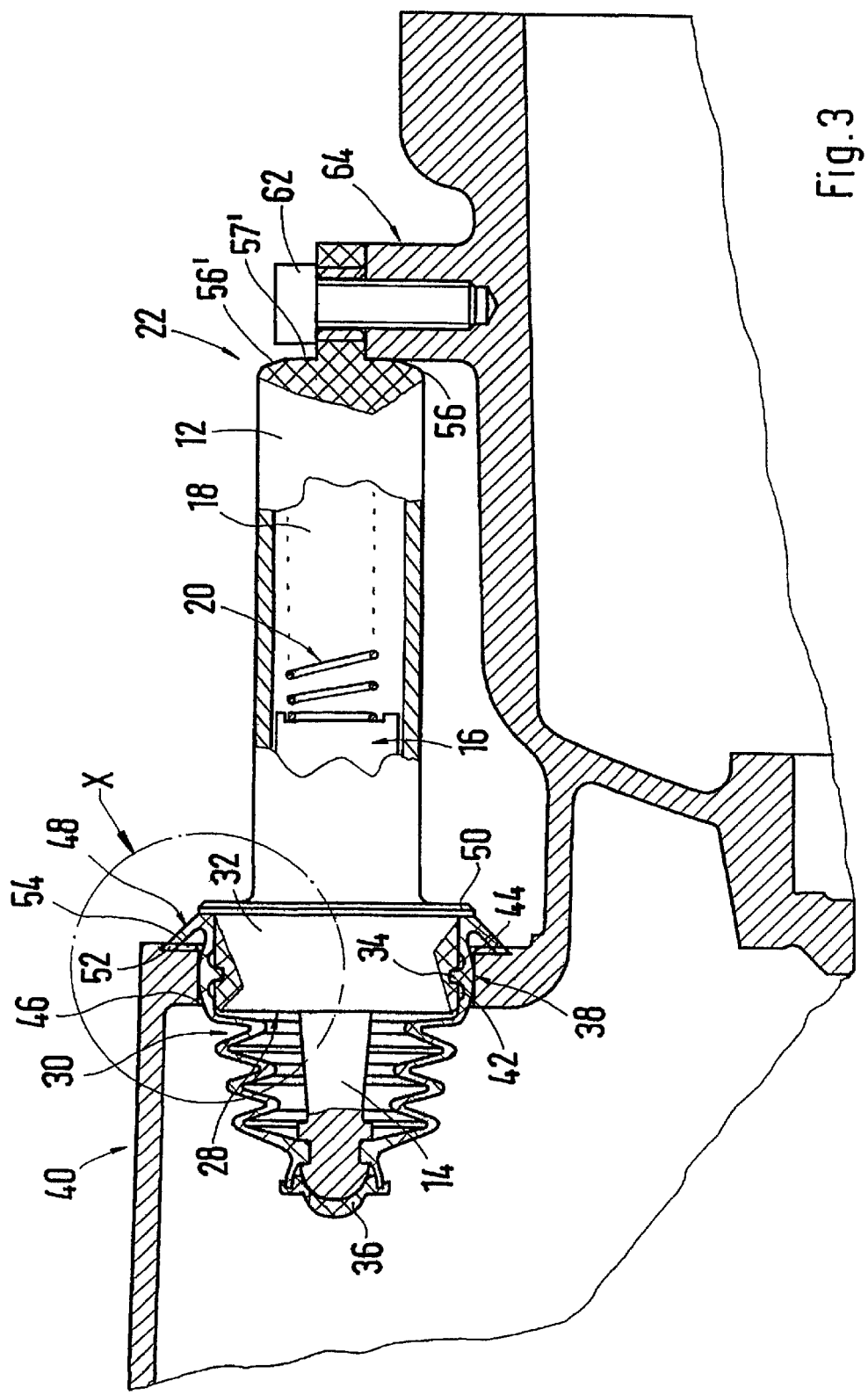
FIG. 3 is a representation of a clutch operating cylinder in a mounted end position.

On the left and the right next to the radial internal web 34, two radially extending ring grooves 42 and 44 are provided on the interior side of the ring section 38. The ring grooves 42 and 44 provide radial elasticity when the clutch operating cylinder 10 in the flange area 32 is radially guided or disposed by the ring section 38 of the bellows 30 in a transmission case opening 46. On the exterior side of the transmission case opening 46, a ring-type sealing lip 48 extends from the ring section 38 of the bellows 30. In the transmission area from the ring section 38 to the ring-type sealing lip 48, the bellows 30 is supported on an axial contact surface 50 of the cylinder casing 12 which forms the end of the flange surface 32. The end 52 of the ring-type sealing lip 48, when installed, rests axially against the exterior surface 54 of the transmission case opening 46 (see FIG. 3).

At the closed end 22 of the cylinder casing 12, a stop 55 is provided which is molded to the cylinder casing 12 and which is provided with a diagonally constructed contact surface 56 and with a straight stop surface 57. The surfaces 56, 57 are important for the installation of the clutch operating cylinder 10 in the transmission case 40, as will be explained in detail below. Furthermore, a fastening eye 58 is molded centrally to the cylinder bottom. A screw 62 extends through the fastening eye 58 and is threaded into a threaded bore 60 in the transmission case 40. The threaded bore 60 is provided in a projection 64 of the transmission case 40. A lateral surface 65 of the projection 60 is constructed as a counterstop with respect to the stop surface 57 of the stop 55 for the axial clamping-in of the clutch operating cylinder 10.

Figure 2:
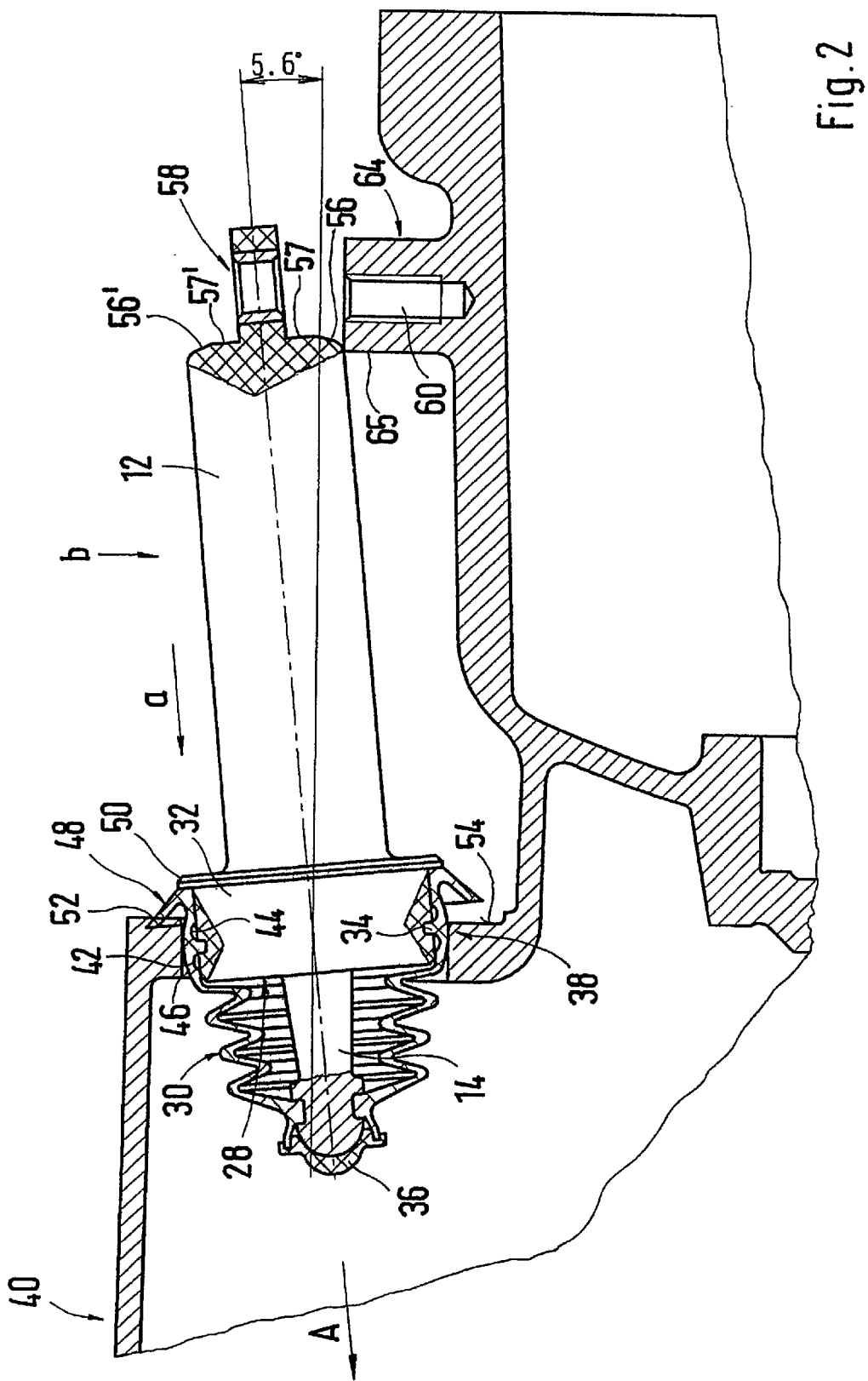
FIG. 2 is a representation of a clutch operating cylinder in a mounting position.

The clutch operating cylinder 10 is mounted in the following manner on or in the transmission case 40:

As illustrated in FIG. 2, first, the clutch operating cylinder 10 with the push rod 14 and with the bellows 30 respectively is diagonally introduced into the transmission case opening 46 until the ring-type sealing lip 48 is axially supported on the exterior surface 54 of the transmission case opening 46. Because of the toroidally constructed ring section 38 of the bellows 30, the diagonal introduction of the clutch operating cylinder 10 into the transmission case opening 46 is facilitated because the contact area between the exterior side of the ring section 38 and the interior side of the transmission case opening 46 is small. The distance between the transmission case opening 46 and the left stop surface 65 of the projection 64 is coordinated such that, as the result of a slight pressing of the clutch operating cylinder 10 in the direction of the arrow a, the diagonal contact surface 56 of the stop 55 comes to rest on the left stop surface 65 of the projection 64. Subsequently, the clutch operating cylinder 10 can be changed only by a lateral pressing in the direction of the arrow b into its end position, in which the straight stop surface 57 comes to rest on the left stop surface 65 of the projection 64. When the spherical end of the push rod 14 engages in a trough of a clutch release device provided for this purpose, because of the pressure spring 20 arranged in the cylinder casing 12, a self-holding final mounting position has been reached in which the clutch operating cylinder 10 is clamped in and only needs to be additionally secured by the screwed connection of the fastening eye 58 on the transmission case 40. As a result of the spring effect of the ring-type sealing lip 48 of the bellows 30 which is axially supported on the exterior surface 54, and without a support on the clutch release device, a self-holding final mounting position is achieved. As a result of a clearance fit of the fastening eye 58 with the fastening screw 62, the axial operating force of the clutch operating cylinder 10 can be completely supported by the axial stop surface 57. The object of the clutch operating cylinder 10 of transmitting the hydrostatic pressure generated in the master cylinder as a force for operating the clutch release device (not shown) is generally known and therefore does not have to be explained here in detail.

On the side situated opposite the stop 55, a stop 55' is provided in an identical manner with a diagonal contact surface 56' and a straight stop surface 57'. The clutch operating cylinder 10 can therefore optionally be installed on the right or on the left transmission case side.

What is claimed is:

1. An arrangement for fastening a hydraulic clutch operating device on a transmission case having a hydraulically operable piston which is guided in a cylinder casing and whose axial movement can be transmitted by way of a push rod to a clutch release device, a first end of the cylinder casing situated opposite a pressure space being closed off by an elastic sleeve through which the push rod is guided which is connected with the piston, wherein a second end of the cylinder casing bounding the pressure space is axially supported on the transmission case and/or is secured by a fastening device, while the first end of the cylinder casing is radially guided within an opening in the transmission case.

2. The arrangement according to claim 1,
wherein the first end of the cylinder casing guided through the opening of the transmission case is constructed as a flange for the sleeve, so that, when installed, a ring section of the sleeve placed on the flange rests by means of its exterior side on an interior wall of the transmission case opening.

3. The arrangement according to claim 2,
wherein the ring section of the sleeve is constructed to be curved toward the outside.

4. The arrangement according to claim 2,
wherein radially arranged ring grooves are provided on the interior side of the ring section.

5. The arrangement according to claim 2,
wherein the sleeve has a radially constructed ring-type sealing lip which is axially supported on an edge of the a transmission case opening.

6. The arrangement according to claim 1,
wherein, at the second end of the cylinder casing, a stop is constructed which rests by a stop surface on a projection of the transmission case for the axial support of the clutch operating cylinder.

7. The arrangement according to claim 6,
wherein the stop has a diagonal contact surface which is provided as a ramp surface to facilitate mounting of the cylinder casing.

8. The arrangement according to claim 1,
wherein, at the second end of the cylinder casing, a fastening eye is provided through which a screw is guided which is fastened in the transmission case.

9. The arrangement according to claim 8,
wherein a clearance fit is provided between the fastening eye and the screw.

10. A clutch operating cylinder having a hydraulically operated piston which is guided in a cylinder casing and whose axial movement can be transmitted by way of a push rod to a clutch release device, a first end of the cylinder casing situated opposite a pressure space being closed off by an elastic sleeve through which the push rod is guided which is connected with the piston, wherein, on a second end of the cylinder casing bounding the pressure space, a stop is provided for the support on a transmission case and fastening devices are provided for the securing of the cylinder on the transmission case.

11. The clutch operating cylinder according to claim 10, wherein the cylinder casing has a flange on which a ring section of the sleeve is placed, which ring section is curved toward the outside and is adjoined by a ring-type sealing lip which, in the installed condition of the clutch operating cylinder, is used for the sealing-off with respect to the transmission case.

12. The clutch operating cylinder according to claim 11, wherein radially arranged ring grooves are provided on an interior side of the ring section and are used for the radial elasticity of the ring section.

13. The clutch operating cylinder according to claim 11, wherein a radial interior web, which is molded to the interior side of the sleeve, engages in a ring groove provided in the flange.

14. An arrangement comprising:
a clutch operating device including an elongated cylinder casing having a first end and a second end; and
a transmission casing having an opening, wherein the first end of the cylinder casing extends into the opening of the transmission casing and is radially supported by interior wall of the opening of the transmission casing, and the second end of the cylinder casing is axially supported on the transmission case.

15. The arrangement according to claim 14, wherein the clutch operating device includes an elastic sleeve having a ring section, and the first end of the cylinder casing includes a flange for mounting the sleeve with the ring section of the sleeve placed radially between the flange and the interior wall of the opening of the transmission case.

16. The arrangement according to claim 15, wherein the ring section of the sleeve is constructed to be curved toward the outside.

17. The arrangement according to claim 15, wherein the sleeve includes radially arranged ring grooves on an interior side of the ring section.

18. The arrangement according to claim 15, wherein the sleeve has a radially constructed ring-shaped sealing lip which is axially supported on an outer surface of the transmission case surrounding the opening.

19. The arrangement according to claim 14, wherein the second end of the cylinder casing includes a stop which contacts a stop surface on a projection on the transmission casing for the axial support of the cylinder casing.

20. The arrangement according to claim 19, wherein the stop has a diagonal contact surface which is provided as a ramp surface to facilitate mounting of the cylinder casing.

21. The arrangement according to claim 14, wherein at the second end of the cylinder casing, the cylinder casing includes a fastening eye, and a screw extends through the fastening eye and is screwed in the transmission case.

22. The arrangement according to claim 21 further including a clearance fit between the fastening eye and the screw.

23. A clutch operating device comprising an elongated cylinder casing having a first end and a second end, wherein the first end of the cylinder casing is configured to extend into an opening of the transmission casing and to be radially supported by interior wall of the opening of the transmission casing, and the second end of the cylinder casing is configured to be axially supported on the transmission case.

24. The clutch operating device according to claim 23, wherein the second end of the cylinder casing has a stop for support on a transmission case.

25. The clutch operating device according to claim 24 further comprising an elastic sleeve having a ring section and a ring-type sealing lip extending from the ring section, wherein the cylinder casing has a flange on which the ring section of the elastic sleeve is placed, which ring section is curved toward the outside, and the sealing lip is axially supported on an outer surface of the transmission case surrounding the opening.

26. The clutch operating device according to claim 25, wherein the sleeve includes radially arranged ring grooves on an interior side of the ring section to provide for radial elasticity of the ring section.

27. The clutch operating device according to claim 26, wherein the sleeve includes a radial interior web on interior side of the sleeve, which web engages in a ring groove on the flange.

28. A method for mounting a clutch operating device to a transmission casing, the clutch operating device including an elongated cylinder casing having a first end and a second end, the method comprising:
positioning the first end of the cylinder casing in an opening of the transmission casing so that the first end is radially supported by interior wall of the opening of the transmission casing; and
supporting axially the second end of the cylinder casing on the transmission case.

29. The method according to claim 28, wherein supporting axially the second end of the cylinder casing includes supporting axially the second end of the cylinder casing using a stop which contacts a stop surface on a projection on the transmission casing for the axial support of the cylinder casing.

30. The method according to claim 29 further comprising pushing the clutch operating device towards the transmission casing to engage the stop with the stop surface using a diagonal contact surface of the stop as a ramp surface.

31. The method according to claim 30 further comprising fastening the clutch operating device to the transmission casing by extending a screw through a fastening eye at the second end of the cylinder casing and fasten the screw in the transmission case.

\* \* \* \* \*